United States Patent
Shenk et al.

(10) Patent No.: US 11,010,894 B1
(45) Date of Patent: May 18, 2021

(54) DERIVING A SKIN PROFILE FROM AN IMAGE

(71) Applicant: NakedPoppy, Inc., Oakland, CA (US)

(72) Inventors: Kimberly Shenk, San Rafael, CA (US); Matthew Camuto, El Cerrito, CA (US); Donya Fozoonmayeh, San Francisco, CA (US); Nina Hua, San Francisco, CA (US); Tatiana Crawford, Denver, CO (US)

(73) Assignee: NakedPoppy, Inc., Oakland, CA (US)

( * ) Notice: Subject to any disclaimer, the term of this patent is extended or adjusted under 35 U.S.C. 154(b) by 100 days.

(21) Appl. No.: 16/525,084

(22) Filed: Jul. 29, 2019

Related U.S. Application Data

(60) Provisional application No. 62/828,335, filed on Apr. 2, 2019.

(51) Int. Cl.
| | |
|---|---|
| *G06K 9/34* | (2006.01) |
| *G06T 7/00* | (2017.01) |
| *G06T 7/90* | (2017.01) |
| *G06K 9/62* | (2006.01) |
| *G06N 20/20* | (2019.01) |
| *A45D 44/00* | (2006.01) |

(52) U.S. Cl.
CPC ............ *G06T 7/0012* (2013.01); *A45D 44/00* (2013.01); *G06K 9/6218* (2013.01); *G06N 20/20* (2019.01); *G06T 7/90* (2017.01); *A45D 2044/007* (2013.01); *G06T 2207/20081* (2013.01); *G06T 2207/30088* (2013.01); *G06T 2207/30101* (2013.01)

(58) Field of Classification Search
CPC ...................... G06T 7/0012; G06T 7/90; G06T 2207/30088; G06T 2207/20081; G06T 2207/30101; A45D 44/00; A45D 2044/007; G06N 20/20; G06K 9/6218; A16B 5/442; A61B 5/444; A61B 5/445; A61B 5/411; G16H 50/20
USPC .......................................................... 382/176
See application file for complete search history.

(56) References Cited

U.S. PATENT DOCUMENTS

| | | |
|---|---|---|
| 8,591,414 B2 | 11/2013 | Kitamura |
| 8,693,768 B1 | 4/2014 | Laforgia |
| 8,855,974 B2 * | 10/2014 | Cho ........................ G06T 11/00 703/2 |
| 9,064,279 B1 | 6/2015 | Tuan |
| 9,442,973 B1 | 9/2016 | Tuan |

(Continued)

*Primary Examiner* — Mahendra R Patel
(74) *Attorney, Agent, or Firm* — Van Pelt, Yi & James LLP

(57) ABSTRACT

Deriving a skin profile from an image is disclosed, including: accessing an input image of a user; deriving a first sub-component based at least in part on the input image of the user; deriving a second sub-component based at least in part on the input image of the user; using a first machine learning model and the first sub-component to determine a predicted base skin color associated with the user; selecting a second machine learning model based at least in part on the predicted base skin color associated with the user; using the second machine learning model and the second sub-component to determine a predicted undertone color associated with the user; determining product recommendations based at least in part on the predicted base skin color associated with the user and the predicted undertone color associated with the user; and presenting the one or more product recommendations at a user interface.

19 Claims, 14 Drawing Sheets

(56) References Cited

U.S. PATENT DOCUMENTS

| | | | |
|---|---|---|---|
| 9,519,927 B1 | 12/2016 | Tuan | |
| 9,687,155 B2 | 6/2017 | Aarabi | |
| 9,760,935 B2* | 9/2017 | Aarabi | G06Q 30/0631 |
| 2004/0218810 A1* | 11/2004 | Momma | A61B 5/0064 382/162 |
| 2007/0076013 A1 | 4/2007 | Campbell | |
| 2009/0054744 A1* | 2/2009 | Kitamura | A61B 5/0082 600/306 |
| 2009/0245603 A1* | 10/2009 | Koruga | A61B 5/445 382/128 |
| 2010/0185064 A1* | 7/2010 | Bandic | A61B 5/415 600/306 |
| 2011/0301441 A1* | 12/2011 | Bandic | A61B 5/0059 600/306 |
| 2013/0251260 A1* | 9/2013 | Aerts | G06T 7/11 382/173 |
| 2013/0279816 A1* | 10/2013 | Zhang | G06K 9/00362 382/225 |
| 2015/0021356 A1* | 1/2015 | Witchell | A45D 44/005 222/23 |
| 2015/0044098 A1* | 2/2015 | Smart | G01J 3/2823 422/82.05 |
| 2015/0356661 A1 | 12/2015 | Rousay | |
| 2016/0314619 A1* | 10/2016 | Luo | G06T 7/344 |
| 2018/0075524 A1* | 3/2018 | Sartori Odizzio | G06Q 30/0643 |
| 2018/0120274 A1* | 5/2018 | Roseway | G08B 21/12 |
| 2019/0026586 A1* | 1/2019 | Liu | G06K 9/627 |
| 2019/0035111 A1* | 1/2019 | Shen | G06K 9/00221 |

\* cited by examiner

| | |
|---|---|
| Base Skin Color A Centroid | (143.2, 91.2, 63.0) |
| Base Skin Color B Centroid | (213.3333333, 164.86666667, 130.5333333) |
| Base Skin Color C Centroid | (244.8, 219.0, 206.4) |
| Base Skin Color D Centroid | (80.375, 53.875, 39.875) |
| Base Skin Color E Centroid | (190.4375, 136.125, 104.5) |
| Base Skin Color F Centroid | (161.42857143, 115.71428571, 83.57142857) |
| Base Skin Color G Centroid | (222.0, 72.0, 52.9) |
| Base Skin Color H Centroid | (112.4, 72.20, 52.9) |
| Base Skin Color I Centroid | (238.0, 202.666667, 177.66666667) |

FIG. 9

| Skin Color A | Undertone 1 | 197,169,145 |
| --- | --- | --- |
| | Undertone 2 | 200,169,148 |
| | Undertone 3 | 201,169,150 |
| | Undertone 4 | 200,169,149 |
| | Undertone 5 | 199,168,150 |
| Skin Color B | Undertone 1 | 196,168,144 |
| | Undertone 2 | 199,167,146 |
| | Undertone 3 | 197,166,145 |
| | Undertone 4 | 199,166,148 |
| | Undertone 5 | 202,165,150 |
| Skin Color C | Undertone 1 | 177,145,117 |
| | Undertone 2 | 180,146,119 |
| | Undertone 3 | 182,146,121 |
| | Undertone 4 | 185,141,126 |
| | Undertone 5 | 190,145,134 |
| Skin Color D | Undertone 1 | 143,112,84 |
| | Undertone 2 | 144,111,84 |
| | Undertone 3 | 148,108,81 |
| | Undertone 4 | 154,107,84 |
| | Undertone 5 | 153,106,88 |

FIG. 11

DERIVING A SKIN PROFILE FROM AN IMAGE

CROSS REFERENCE TO OTHER APPLICATIONS

This application claims priority to U.S. Provisional Patent Application No. 62/828,335 entitled DERIVING A SKIN PROFILE FROM AN IMAGE filed Apr. 2, 2019 which is incorporated herein by reference for all purposes.

BACKGROUND OF THE INVENTION

When individuals wish to receive products that match the coloring of their skin, they typically must go into a physical (e.g., cosmetic) retail store and ask a sales associate to manually evaluate their skin. However, manually determining a person's skin profile may be inconsistent and even inaccurate. Furthermore, going to physical retail stores to receive evaluations of skin coloring is inconvenient and inefficient.

BRIEF DESCRIPTION OF THE DRAWINGS

Various embodiments of the invention are disclosed in the following detailed description and the accompanying drawings.

FIG. 9 is a diagram showing an example table storing the centroid values of the nine clusters associated with an example base skin color machine learning model.

FIG. 11 is a diagram showing an example table storing the centroid values across undertone clusters associated with four example undertone color machine learning models.

DETAILED DESCRIPTION

Figure 1:
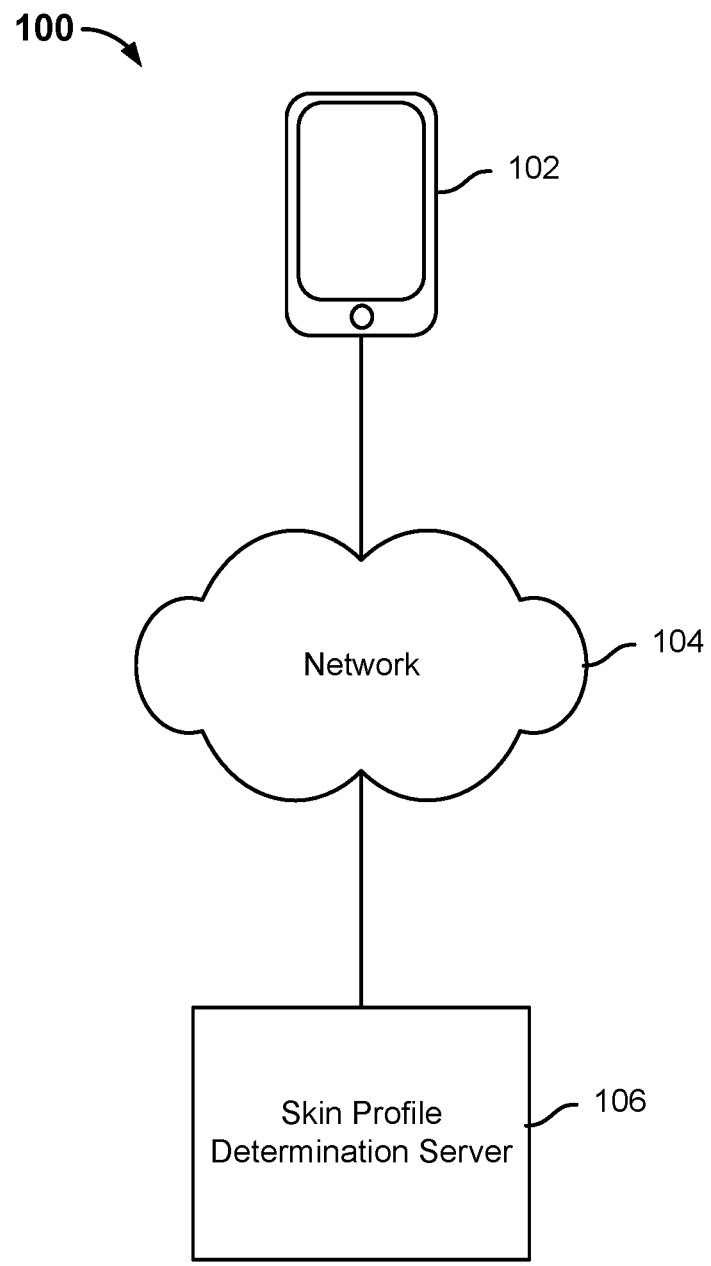
FIG. 1 is a diagram showing an embodiment of a system for generating a skin profile based on an input image of a user.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of generating a skin profile based on an input image of a user are described herein. An input image of a user is accessed. In various embodiments, the input image is of the user's body part that includes a vein. For example, the body part is a wrist. A first sub-component is derived from the input image, where the first sub-component is associated with the body part without the vein. A second sub-component is derived from the input image, where the second sub-component is associated with the vein. A first machine learning model and the first sub-component are used to determine a predicted base skin color associated with the color. A second machine learning model is selected based at least in part on the predicted base skin color associated with the user. The second machine learning model and the second sub-component are used to determine a predicted undertone color associated with the user. One or more product recommendations are presented based at least in part on the predicted base skin color associated with the user and the predicted undertone color representation associated with the user.

FIG. 1 is a diagram showing an embodiment of a system for generating a skin profile based on an input image of a user. System 100 includes device 102, network 104, and skin profile determination server 106. Network 104 may be implemented using high speed data and/or telecommunication networks. Device 102 communicates with skin profile determination server 106 over network 104.

Device 102 is configured to locally obtain an input image of a user and send the received input image to skin profile determination server 106 over the network. In some embodiments, device 102 is configured to capture the input image via a camera or other sensor function. In some embodiments, device 102 is configured to obtain the input image via a storage that is local to device 102. Examples of device 102 may include a phone, a tablet, a computer, or any other computing system. For example, a user of device 102 may use the device to access a website or an application that is provided by skin profile recommendation server 106. The website or the application is configured to provide instructions to the user on how to use a camera function of device 102 to capture an image of a particular body part of the user and where the body part must include a visible vein. For example, the body part comprises a wrist, the back of a hand, a neck, an ankle, or the crease of an elbow. The body part may be any body part that includes at least one visible vein. In some embodiments, the website or the application may also instruct the user to capture an image. In some embodiments, to protect the user's privacy, an input image of the user's face is not needed to determine a skin profile associated with the user. In some embodiments, the website or the application may cause the camera function on the device to force a flash in the capture of the input image so that the resulting image is sharper/brighter and therefore easier to analyze. In some embodiments, at least a portion (e.g., a sub-component) that is derived from the image is used to perform lighting adjustment on the image itself or another sub-component thereof.

Skin profile determination server 106 is configured to use the input image of the user to determine a skin profile associated with the user. In various embodiments, the skin profile associated with the user comprises at least a predicted base skin color and a predicted undertone color. In various embodiments, a "skin color" of a user comprises a surface color of the user's skin. The skin color of a user may vary based on the amount of melanin that is in the user's skin and therefore may vary based on the amount of sun exposure that the user receives. In various embodiments, an "undertone color" of a user comprises the subtle influence of one color underneath the surface of the skin that distinguishes it from similar colors. Put another way, different undertones may cause the same base skin color to appear differently. Unlike base skin color, the undertone color is not affected by the amount of melanin in the skin and therefore does not vary based on sun exposure. As will be described in further detail herein, skin profile determination server 106 is configured to process the input image into two or more sub-components and then analyze the sub-components to generate a skin profile for the user. In various embodiments, skin profile determination server 106 is configured to determine one or more products that are compatible with the determined skin profile for the user and then cause a user interface that recommends the one or more products to be presented at device 102.

In various embodiments, a "color" (e.g., skin color or undertone color) may be represented as a numerical value. For example, a color may be represented as an RGB value, HSL value, HEX value, HSV value, CMYK value, CIELAB, value or a combination of two or more of those values.

In some embodiments, after skin profile determination server 102 generates a skin profile based on the input image of a user, skin profile determination server 102 may store attributes or content that is derived from the input image rather than the original input image itself, in order to protect the user's privacy.

Figure 2:
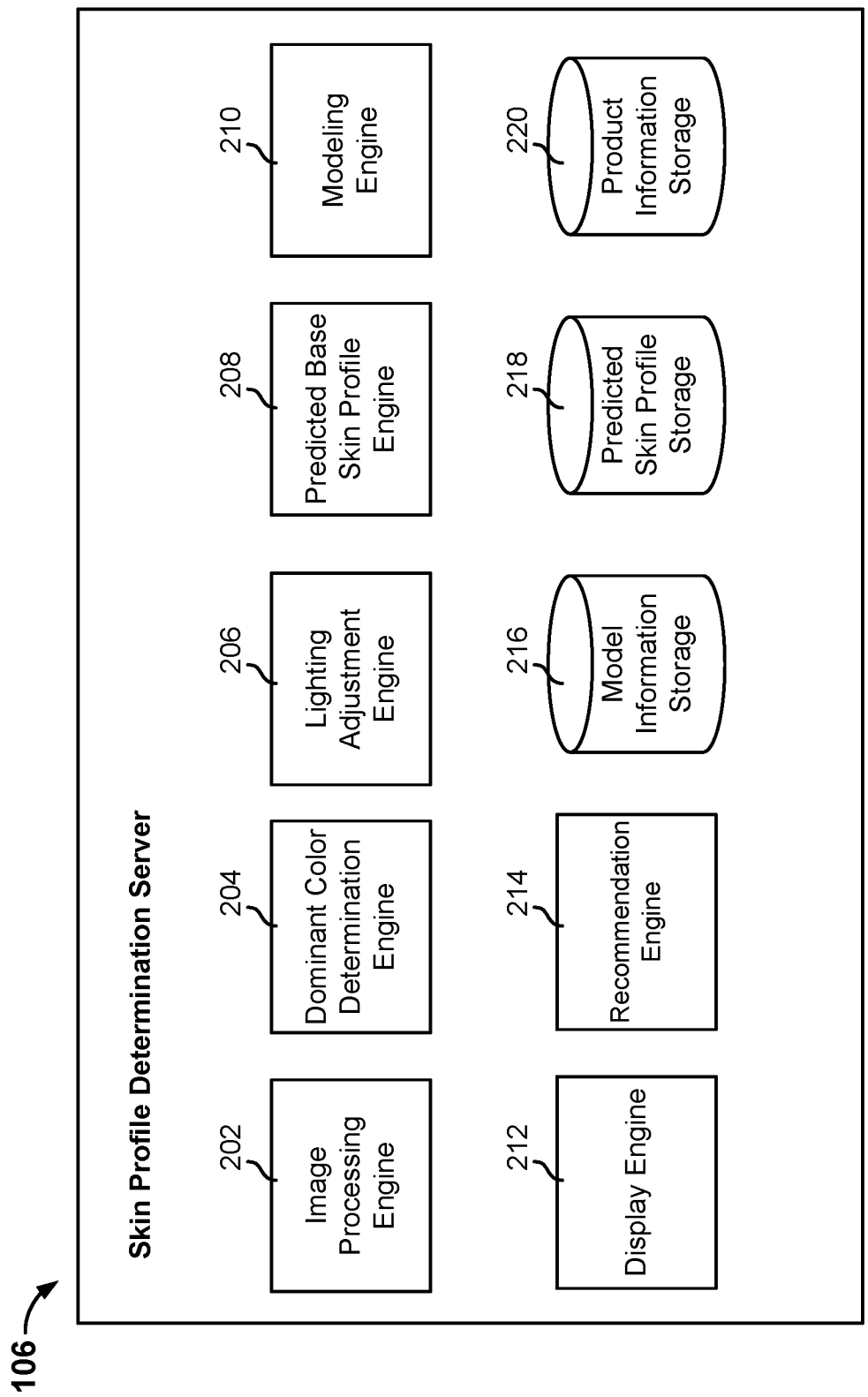
FIG. 2 is a diagram showing an example of a skin profile determination server.

FIG. 2 is a diagram showing an example of a skin profile determination server. In some embodiments, skin profile determination server 106 of system 100 of FIG. 1 may be implemented using the example of FIG. 2. In FIG. 2, the example skin profile determination server includes image processing engine 202, dominant color determination engine 204, lighting adjustment engine 206, predicted base skin profile engine 208, modeling engine 210, display engine 212, recommendation engine 214, model information storage 216, predicted skin profile storage 218, and product information storage 220. Each of image processing engine 202, dominant color determination engine 204, lighting adjustment engine 206, predicted base skin profile engine 208, modeling engine 210, display engine 212, and recommendation engine 214 may be implemented using hardware and/or software. Each of model information storage 216, predicted skin profile storage 218, and product information storage 220 may be implemented using one or more types of storage media.

Image processing engine 202 is configured to derive two or more sub-components from an accessed input image of a user. In various embodiments, all sub-components are derived from pixel values of the input image of the user. One example of a sub-component is a sub-image, which is a compilation of pixels from a section of the input image. Another example of a sub-image is an input layer (to a neural network) which includes a grouping of pixel values from the input image. From the input layer, hidden layers can be created which include neurons. The neurons are developed from groupings of pixels and consist of features that are created by converting the image pixels into these representative features. In various embodiments, the user's input image is of a body part of the user and also shows at least one visible vein on the body part. For example, the body part is the user's wrist. In various embodiments, image processing engine 202 is configured to parse out only the body part from the input image and generate a first sub-component that includes only the body part and not the vein(s) or the background (relative to the body part) of the original input image. For example, image processing engine 202 may use edge detection to identify the body part within the original input image and also the vein(s) to generate a new image that is associated with only the body part. In addition or alternative to edge detection, image processing engine 202 may use machine learning techniques such as pattern recognition to identify the body part and/or the veins in the input image and account for things like tattoos, watches, birthmarks, hair follicles, etc. Image processing engine 202 may also use neural networks to create input layers that include neurons to be used to identify the body part and/or veins. In various embodiments, image processing engine 202 is configured to include only the veins and not the body part or the background (relative to the body part) of the original input image and generate a second sub-component that includes only the veins. For example, image processing engine 202 may use edge detection to identify the vein(s) within the original input image and to generate a new image that includes only the veins. In some embodiments, image processing engine 202 is configured to generate a third sub-component that includes only the background (relative to the body part) of the original input image that includes neither the body part nor the veins. As will be described in further detail below, the sub-components that are each derived from the original input image of the user are to be used to determine a skin profile for the user. In some embodiments, image processing engine 202 is configured to send the first sub-component that includes the body part and the second sub-component that includes the veins to predicted base skin profile engine 208. In some embodiments, image processing engine 202 is configured to send the third sub-component that includes the background content to lighting adjustment engine 206.

Dominant color determination engine 204 is configured to determine a corresponding dominant color for each of the two or more sub-components that have been derived by image processing engine 202 from the original input image. In various embodiments, dominant color determination engine 204 is configured to determine a dominant color from the first sub-component that includes only the body part and where this dominant color may sometimes be referred to as the "skin dominant color." In various embodiments, dominant color determination engine 204 is configured to determine a dominant color from the second sub-component that includes only the vein(s) and where this dominant color may sometimes be referred to as the "undertone dominant color." In various embodiments, dominant color determination engine 204 is configured to determine a dominant color from the third sub-image that includes/shows only the background and where this dominant color may sometimes be referred to as the "background dominant color." In some embodiments, dominant color determination engine 204 is configured to determine a corresponding dominant color from each of the two or more sub-components by applying a clustering (e.g., K-means) to cluster the pixel colors of each sub-component and then determine a representative (e.g., centroid) (e.g., RGB) value of the largest pixel cluster for each sub-component as the dominant color for that sub-component within the corresponding skin tone range. In some embodiments, dominant color determination engine 204 is configured to send the skin dominant color and the undertone dominant color to predicted base skin profile engine 208 and to send the background dominant color to lighting adjustment engine 206.

Lighting adjustment engine 206 is configured to determine a lighting adjustment corresponding to the input image of the user's body part to standardize lighting across the ecosystem of images. In some embodiments, lighting adjustment engine 206 is configured to obtain a lighting adjustment model from model information storage 216. In some embodiments, the lighting adjustment model is generated using deep learning methods by modeling engine 210. In various embodiments, lighting adjustment engine 206 is configured to determine a lighting adjustment from a background dominant color that is determined from the input image. In some embodiments, the lighting adjustment is represented by pixel values which can be in the form of an RGB value, an HSL value, an HEX value, an HSV value, CMYK value, CIELAB value, or a combination of two or more of those values. In some embodiments, lighting adjustment engine 206 is configured to use a neural network to create input layers from the pixel values of the input image. The neural network learns the lighting spectrum across all of the input layers and creates something similar to a normalizing input layer that allows it to learn the proper light adjustment to apply to a new image in order to accurately predict the base skin color. For example, lighting adjustment engine 206 is configured to determine a lighting adjustment that can be used to modify each of the first sub-component that includes only the body part and the second sub-component that includes only the veins. Using transfer learning, a deep learning model will output other lightings and base skin color and undertone under those, as will be described below.

Predicted base skin profile engine 208 is configured to use at least the skin dominant color and the undertone dominant color to respectively determine a predicted base skin color and a predicted undertone color for the user. Predicted base skin profile engine 208 is configured to obtain a base skin color machine learning model from model information storage 216. In some embodiments, the base skin color machine learning model is generated by modeling engine 210. In various embodiments, the base skin color machine learning model is represented by at least representative (e.g., centroid) values corresponding to respective clusters that are determined by clustering the pixel values of images of body parts without veins, where each cluster corresponds to a different base skin color. Predicted base skin profile engine 208 is configured to input the skin dominant color into the skin color machine learning model to determine the cluster centroid value that is the closest to the base skin dominant color. In some embodiments, the base skin dominant color is modified by the lighting adjustment before it is input into the base skin color machine learning model. This cluster centroid that is the closest to the modified base skin dominant color value is determined as the "predicted base skin color."

In some embodiments, a separate undertone color machine learning model is maintained for each base skin color cluster that is associated with the base skin color machine learning model. Predicted base skin profile engine 208 is configured to obtain an undertone color machine learning model from model information storage 216. In some embodiments, the undertone color machine learning model is generated by modeling engine 210. The undertone color machine learning model corresponding to each base skin color is represented by at least representative (e.g., centroid) values corresponding to respective clusters that are determined by clustering pixel values corresponding to veins from body parts that are associated with the undertone color machine learning model's corresponding skin color, where each cluster corresponds to a different undertone color for that corresponding skin color. Predicted base skin profile engine 208 is configured to input the undertone dominant color into the undertone color machine learning model to determine the cluster centroid value that is the closest to the undertone dominant color. Another possible implementation is using deep learning models to determine undertone color, with or without the other machine learning techniques described above. In some embodiments, the undertone dominant color is modified by the lighting adjustment before it is input into the undertone color machine learning model. The cluster centroid that is the closest to the modified undertone dominant color value is determined as the "predicted undertone color." In various embodiments, predicted base skin profile engine 208 is configured to store a skin profile corresponding to the user at predicted skin profile storage 218, where the skin profile includes at least the predicted base skin color and the predicted undertone color.

Display engine 212 is configured to present a visual presentation corresponding to each of at least the predicted base skin color and the predicted undertone color for the user. In some embodiments, display engine 212 uses predetermined mappings between base skin color values, undertone color values, and visual representations (e.g., images) to identify a corresponding representation (e.g., an image of the predicted base skin color and undertone color and/or images of colors that are compatible with the predicted base skin color and the predicted undertone color) for the predicted base skin color and the predicted undertone color. Display engine 212 is configured to send the representation for the predicted base skin color and the representation for the predicted undertone color to a device associated with the user where the representations are to be presented at a user interface of the device. In various embodiments, display engine 212 is further configured to send feedback controls to the device to allow the users to provide feedback to the predicted base skin color and the predicted undertone color. The feedback controls may ask the user to confirm whether the predicted base skin color and the predicted undertone color are correct and if not, ask the user to provide feedback to correct each predicted base skin and/or undertone color. For example, the feedback controls may ask the user for alternative data that the system will use to derive whether his or her correct skin or undertone color is lighter or darker than the predicted colors. Display engine 212 is configured to send the received user feedback to predicted skin profile storage 218 so that the user's stored predicted base skin color and predicted undertone color can be updated accordingly. In some embodiments, display engine 212 is configured to send the user's updated predicted base skin color and predicted undertone color to modeling engine 210 such that modeling engine 210 can use the user's updated predicted base skin color and predicted undertone color to respectively generate an updated version of the skin machine learning model and various instances of undertone color machine learning models.

Recommendation engine 214 is configured to generate recommendations for the user based on the user's skin profile. In various embodiments, recommendation engine 214 is configured to use the user's predicted base skin color and predicted undertone color along with product information stored at product information storage 220 to generate a set of recommendations for the user. In some embodiments, each set of product attributes that is stored in product information storage 220 includes information identifying skin colors and/or undertone colors that are compatible/ recommended for the product. For example, product information storage 220 includes cosmetic products (e.g., foundation, lipstick, eye liner, eye shadow, blush, concealer, mascara, etc.). In some embodiments, recommendation engine 214 sends the set of recommended products from product information storage 220 that matches the user's predicted base skin color and predicted undertone color to display engine 212 for display engine 212 to send the information to the user's device, where the recommendations are presented at a user interface of the device. In some embodiments, display engine 212 is further configured to collect data on the user's attributes (e.g., skin type, eye color, hair color, allergies, etc.) which is used in recommendation engine 214 in order to recommend products from product information storage 220 that match the user's attributes along with the user's predicted base skin color and predicted undertone color. In some embodiments, display engine 212 is further configured to collect data on the user's engagement (e.g., purchase activity, selection activity) with the recommendations and send that back to recommendation engine 214 so that recommendation engine 214 can update its product recommendation determination based on such collected data.

Figure 3:
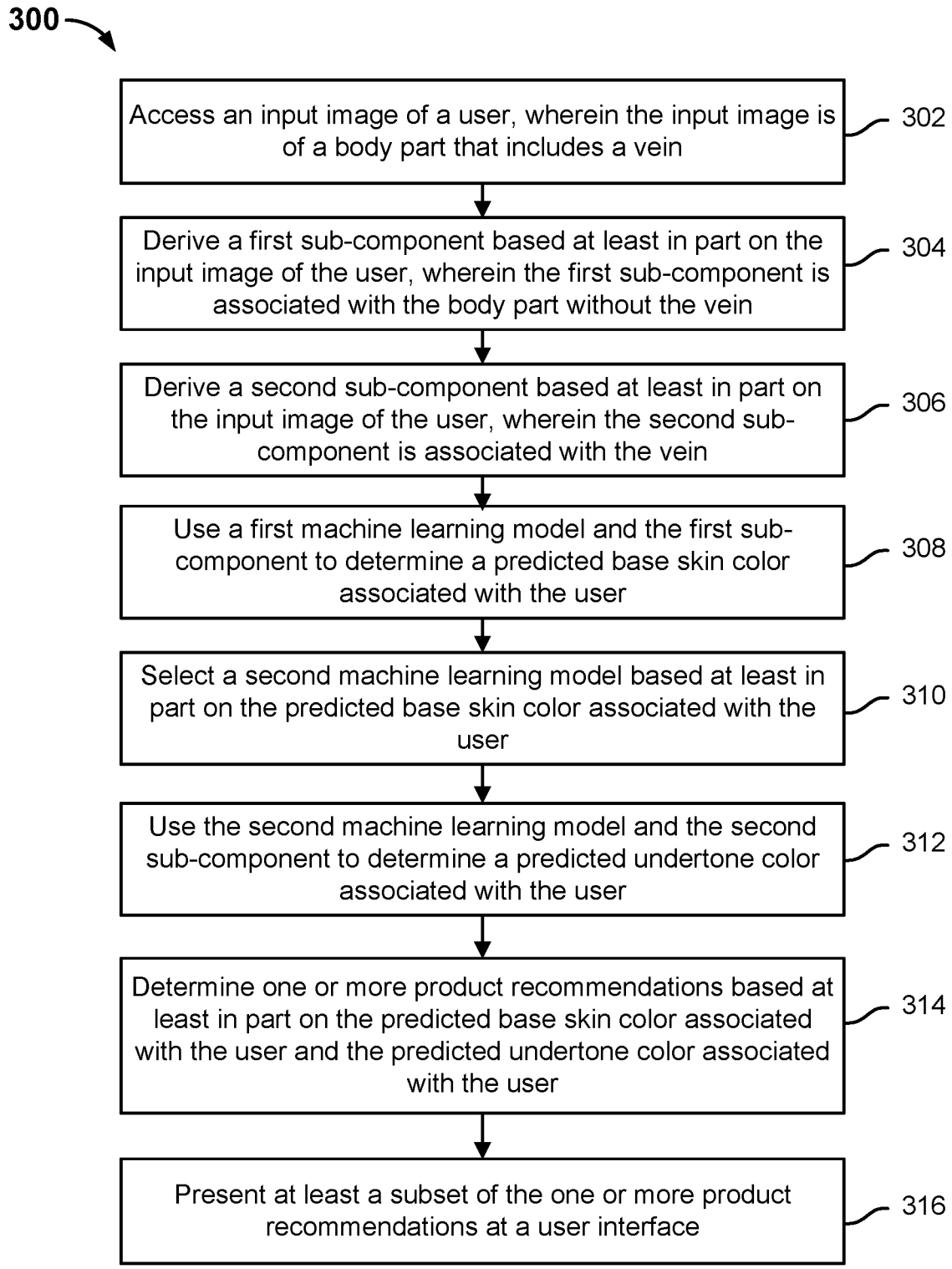
FIG. 3 is a flow diagram showing an embodiment of a process for generating a skin profile based on an input image of a user.

FIG. 3 is a flow diagram showing an embodiment of a process for generating a skin profile based on an input image of a user. In some embodiments, process 300 may be performed by skin profile determination server 106 of FIG. 1.

At 302, an input image of a user is accessed, wherein the input image is of a body part that includes a vein. For example, an input image of the user's body part (e.g., wrist) including a vein is obtained from a device that was used to store and/or capture the input image.

At 304, a first sub-component is derived based at least in part on the input image of the user, wherein the first sub-component is associated with the body part without the vein.

At 306, a second sub-component is derived based at least in part on the input image of the user, wherein the second sub-component is associated the vein. The input image is then parsed into at least two sub-components. A first sub-component includes the body part but does not include the vein. For example, the first and second sub-components can be derived by using edge detection and/or deep learning to determine the body part in the input image and the vein(s) within the identified body part.

At 308, a first machine learning model and the first sub-component are used to determine a predicted base skin color associated with the user.

At 310, a second machine learning model is selected based at least in part on the predicted base skin color associated with the user.

At 312, the second machine learning model and the second sub-component are used to determine a predicted undertone color associated with the user. After the first and second sub-components are determined, the first sub-component that includes the body part but without the vein is input into a first machine learning model that is trained to determine a predicted base skin color that is associated with the first sub-component. The second sub-component that includes the vein is input into a second machine learning model that is selected to correspond to the predicted base skin color. The selected second machine learning model is trained to determine a predicted undertone color that is associated with the second sub-component.

At 314, one or more product recommendations are determined at least in part on the predicted base skin color associated with the user and the predicted undertone color associated with the user. A skin profile that is determined based at least in part on the combination of the predicted base skin color and the predicted undertone color associated with the user can be compared against the metadata of products to determine a set of products that are compatible with the user's skin profile.

At 316, at least a subset of the one or more recommendations is presented at a user interface.

Figure 4:
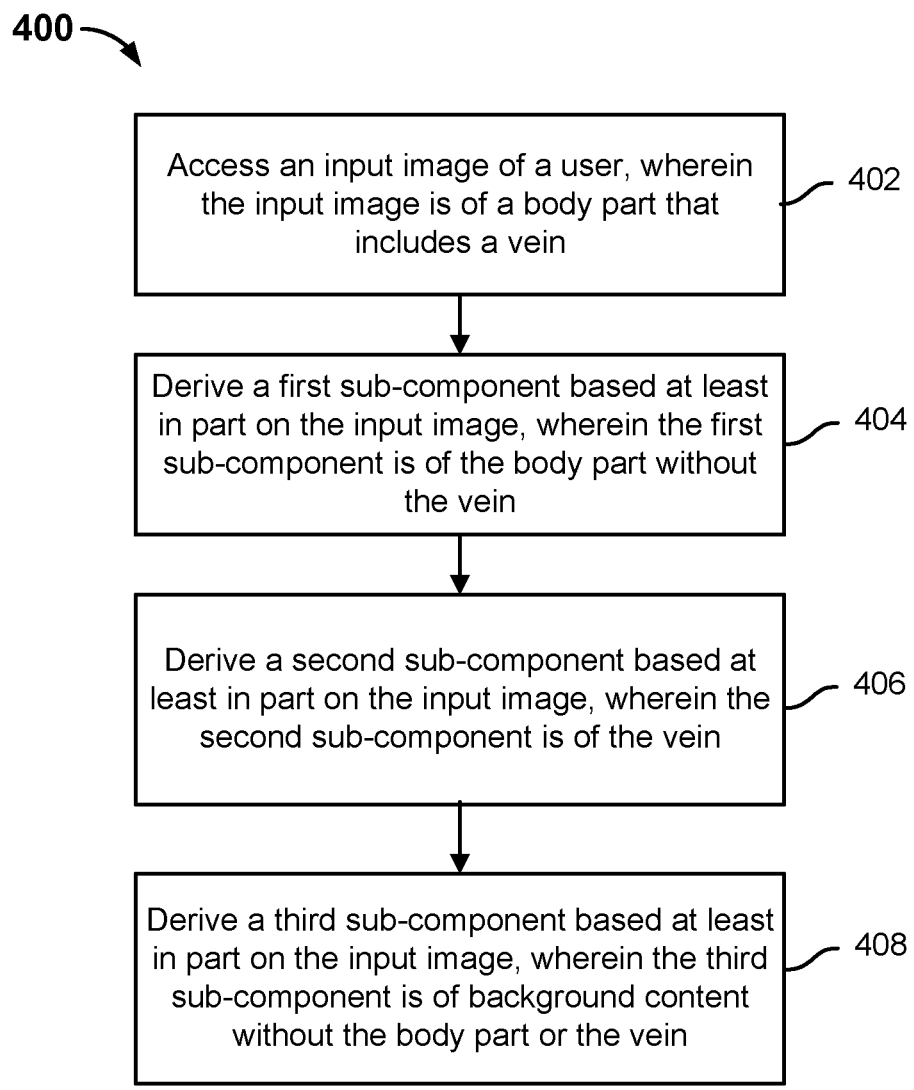
FIG. 4 is a flow diagram showing an embodiment of a process for deriving multiple sub-components from an input image of a user's body part that includes a vein.

FIG. 4 is a flow diagram showing an embodiment of a process for deriving multiple sub-components from an input image of a user's body part that includes a vein. In some embodiments, process 400 may be performed by skin profile determination server 106 of FIG. 1. In some embodiments, at least a portion of process 300 of FIG. 3 may be implemented by process 400.

In the example of process 400, an input image of a user's body part that includes a vein can be parsed out into three sub-components. In other examples, the input image may be processed into more or less than three sub-components.

At 402, an input image of a user is accessed, wherein the input image is of a body part that includes a vein.

At 404, a first sub-component is derived based at least in part on the input image, wherein the first sub-component is of the body part without the vein. The first sub-component includes the body part (e.g., wrist) but not the vein that is on the body part.

At 406, a second sub-component is derived based at least in part on the input image, wherein the second sub-component is of the vein. The second sub-component includes just the vein.

At 408, a third sub-component is derived based at least in part on the input image, wherein the third sub-component is of background content without the body part or the vein. The third sub-component shows the background of the original input image but not the body part or the vein. The three sub-components may be determined from the original input image using edge detection.

Figure 5:
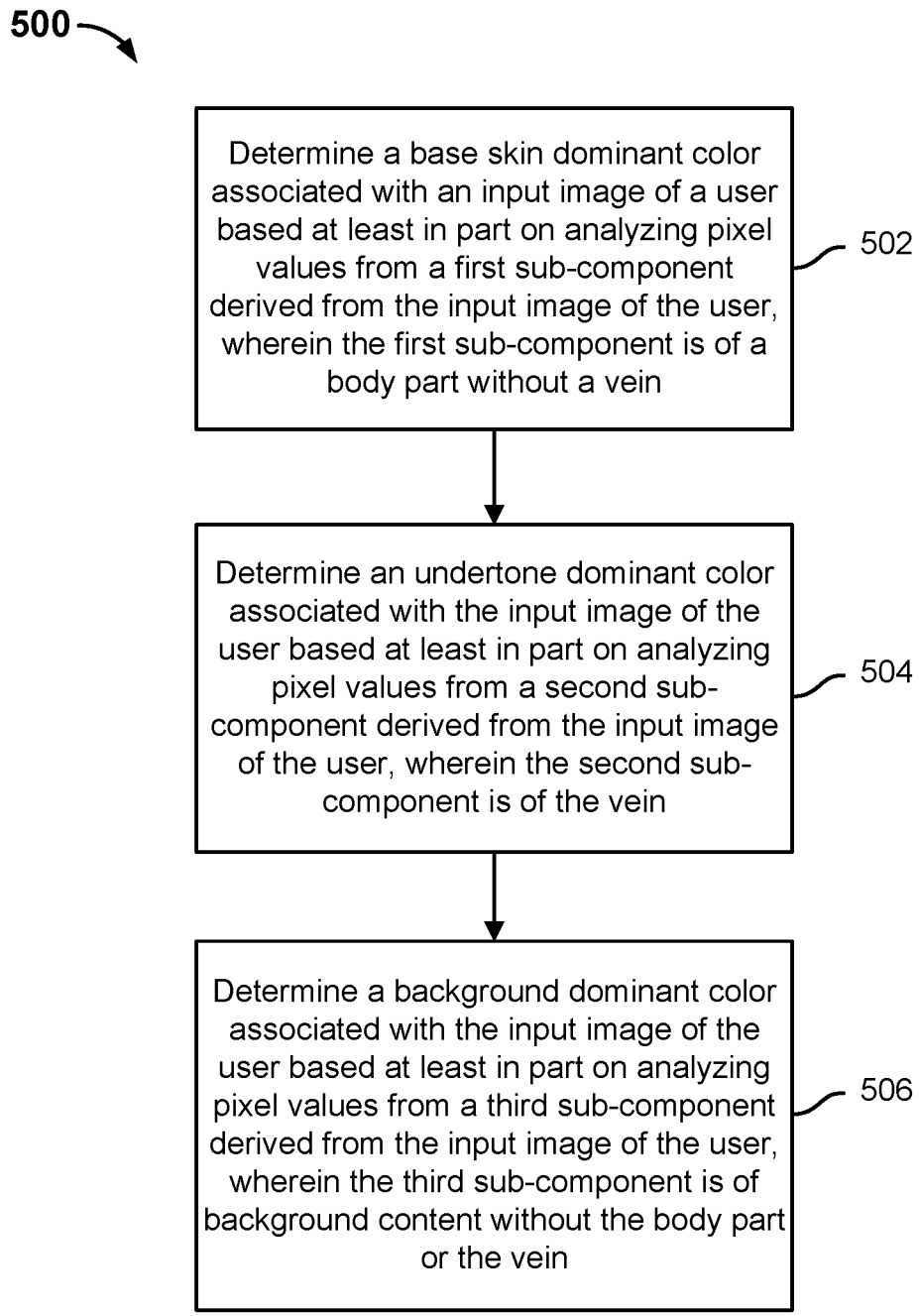
FIG. 5 is a flow diagram showing an embodiment of a process for determining dominant colors from the sub-components that have been derived from an input image of the user.

FIG. 5 is a flow diagram showing an embodiment of a process for determining dominant colors from the sub-components that have been derived from an input image of the user. In some embodiments, process 500 may be performed by skin profile determination server 106 of FIG. 1. In some embodiments, at least a portion of process 300 of FIG. 3 may be implemented by process 500.

At 502, a base skin dominant color associated with an input image of a user is determined based at least in part on analyzing pixel values from a first sub-component derived from the input image of the user, wherein the first sub-component is of a body part without a vein.

At 504, an undertone dominant color associated with the input image of the user is determined based at least in part on analyzing pixel values from a second sub-component derived from the input image of the user, wherein the second sub-component is of the vein.

At 506, a background dominant color associated with the input image of the user is determined based at least in part on analyzing pixel values from a third sub-component derived from the input image of the user, wherein the third sub-component is of background content without the body part or the vein.

As shown in process 500, a dominant color of each of the three sub-components, which are derived from an input image of a user (e.g., such as those determined using a process such as the process of FIG. 4), can be determined by analyzing the pixel colors (e.g., RGB values) of each sub-component. In some embodiments, analyzing pixel colors of each sub-component includes using machine learning methods. For example, the machine learning method of clustering (e.g., K-means) can be used to cluster the pixel colors of each sub-component and a representative (e.g., centroid) (e.g., RGB) value of the largest cluster for each sub-component will be determined as the dominant color for that sub-component. Other example techniques besides K-means clustering are spectral clustering, hierarchical clustering, k nearest neighbors (knn), and expectation-maximization (EM) clustering. All of these techniques would cluster the pixel values of the input image. The dominant colors would be determined based on the centroid of the dominant cluster. The dominant color that is determined for the first sub-component is sometimes referred to as the "base skin dominant color," the dominant color that is determined for the second sub-component is sometimes referred to as the "undertone dominant color," and the dominant color that is determined for the third sub-component is sometimes referred to as the "background dominant color."

Figure 6:
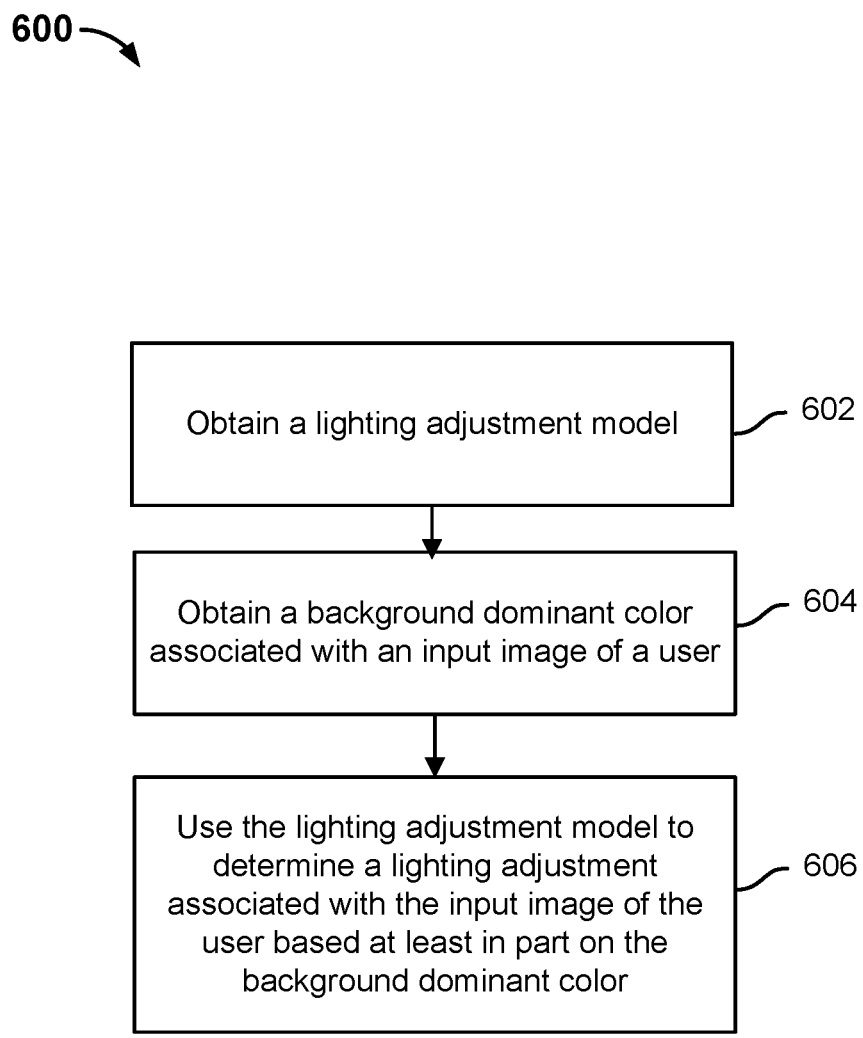
FIG. 6 is a flow diagram showing an example of a process for determining a lighting adjustment from an input image of the user.

FIG. 6 is a flow diagram showing an example of a process for determining a lighting adjustment from an input image of the user. In some embodiments, process 600 may be performed by skin profile determination server 106 of FIG. 1.

At 602, a lighting adjustment model is obtained. In some embodiments, a lighting adjustment model is trained based on sub-components. As mentioned above, all sub-components are derived from pixel values. One example of a sub-component is a basic sub-image, which is a compilation of pixels from a section of the input image. Another example is an input layer which includes a grouping of pixel values from the input image. From the input layer, hidden layers can be created which consist of neurons. The neurons are developed from groupings of pixels and consist of features that are created by converting the image pixels into these representative features.

For example, using transfer learning, a deep learning model will be used to determine the lighting conditions images were taken in (e.g., natural light, warm fluorescent light). Once the lighting condition is determined, white balance adjustment can be used to standardize the images for accurate determination of base skin tone color and undertone. In training a deep learning model, all images would be labeled with their actual base skin color. Neural networks would be used to create input layers from the pixel values of the input image. These pixel values would be taken from the background of the image as well as other areas of the input image. In effect, during training, neurons from the input layers would be constructed for each image within a known base skin color. The neural network would learn the lighting spectrum across all of the images and create something similar to a normalizing input layer that allows it to learn the proper light adjustment to apply to a new image in order to accurately predict the base skin color.

At 604, a background dominant color associated with an input image of a user is obtained. The background dominant color may be determined from the sub-component that includes only the background content of the input image using a process such as process 500 of FIG. 5.

At 606, the lighting adjustment model is used to determine a lighting adjustment associated with the input image of the user based at least in part on the background dominant color. The lighting adjustment may be used, in some embodiments, to modify the "base skin dominant color" and/or the "undertone dominant color," as will be described in further detail below. This is to account for poor lighting that might cause the dominant base skin and undertone colors to be too light or too dark if not corrected.

Figure 7:
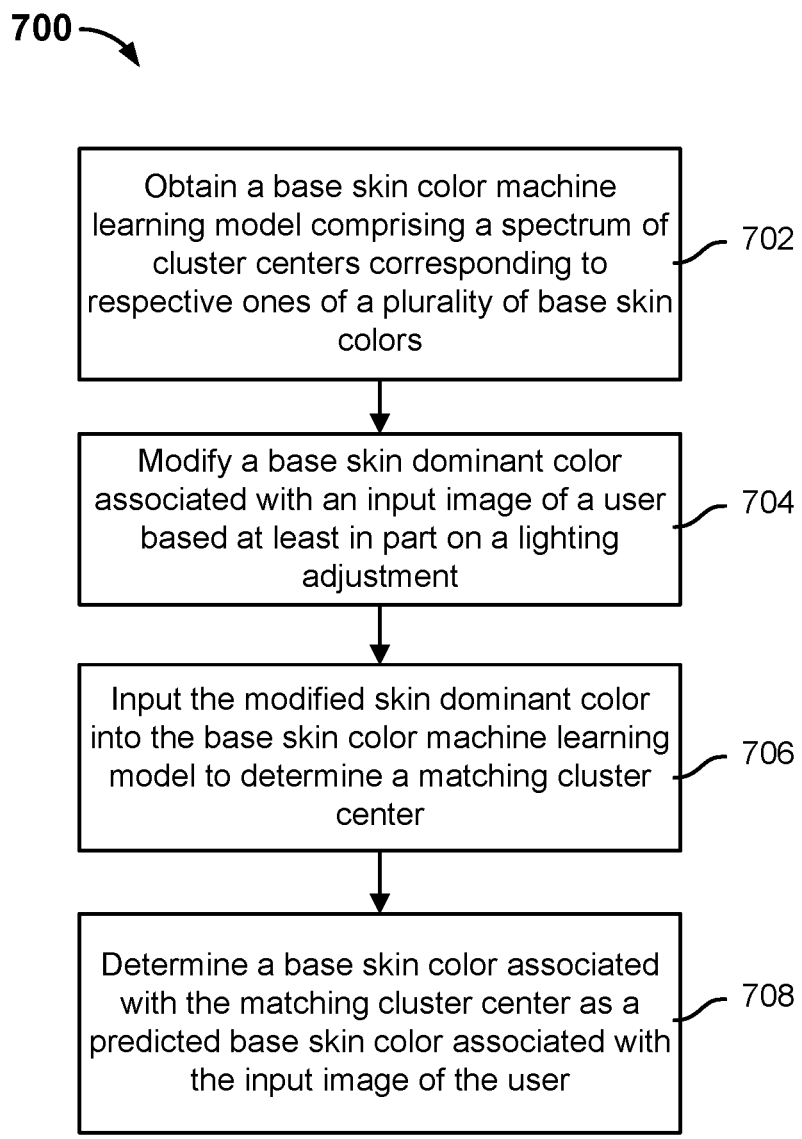
FIG. 7 is a flow diagram showing an embodiment of a process for a predicted base skin color for an input image of the user.

FIG. 7 is a flow diagram showing an embodiment of a process for a predicted base skin color for an input image of the user. In some embodiments, process 700 may be performed by skin profile determination server 106 of FIG. 1. In some embodiments, at least a portion of process 300 of FIG. 3 may be implemented by process 700.

At 702, a base skin color machine learning model comprising a spectrum of cluster centers corresponding to respective ones of a plurality of base skin colors is obtained. In some embodiments, a spectrum comprises a range. A base skin color machine learning model is trained with images of body parts without veins that are pre-labeled with the known skin colors that are associated with the users (e.g., the faces of the users) in those images. In some embodiments, the pixel values of the pre-labeled images of body parts are clustered (e.g., using machine learning) by their respective RGB (and/or HSV, HSL, CIELAB, CYMK) values. Each resulting cluster would be associated with a corresponding base skin color label. For example, the base skin color that is associated with each cluster is the most frequently occurring pre-labeled base skin color associated with images in that cluster. The representative/center (e.g., centroid) value of each cluster is determined.

At 704, a base skin dominant color associated with an input image of a user is modified based at least in part on a lighting adjustment. The "base skin dominant color" for the input image of the user (e.g., that was determined using process 500 of FIG. 5) is modified by the "lighting adjustment" (e.g., that was determined using process 600 of FIG. 6).

At 706, the modified skin dominant color is input into the base skin color machine learning model to determine a matching cluster center.

At 708, a base skin color associated with the matching cluster center is determined as a predicted base skin color associated with the input image of the user. The modified skin dominant color is input into the base skin color machine learning model. The center (e.g., centroid) (e.g., RGB) value that is the closest to the modified skin dominant color value is determined as the "predicted base skin color."

Figure 8:
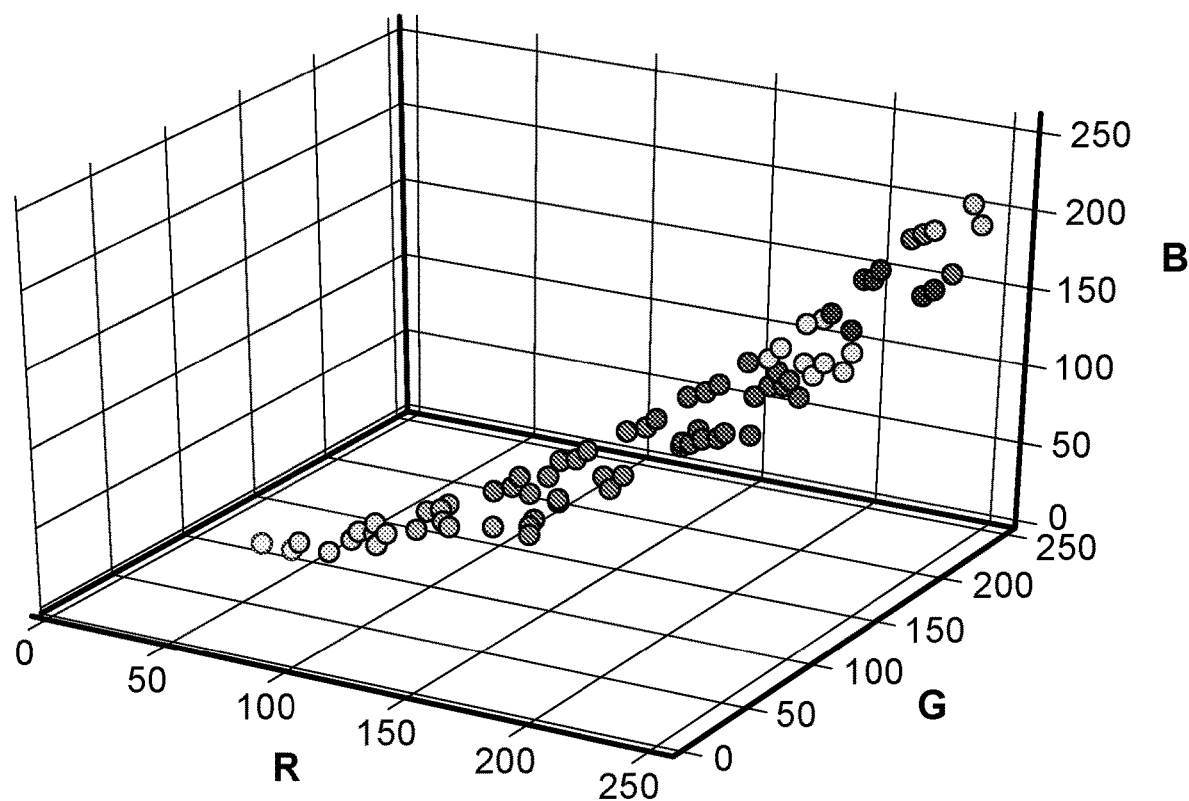
FIG. 8 is a diagram showing an example visualization of clusters of images associated with a skin color machine learning model.

FIG. 8 is a diagram showing an example visualization of clusters of images associated with a skin color machine learning model. The plot in FIG. 8 is shown along three axes, each being a component of RGB. In the example, points representing images that belong to the same cluster of images are shown to be located closer together in the plot. The centroid value of each skin color cluster is a representative point of the cluster and/or the arithmetic mean position of all the points/images in the cluster.

FIG. 9 is a diagram showing an example table storing the centroid values of the nine clusters associated with an example base skin color machine learning model. As mentioned above, each cluster of the base skin color machine learning model is associated with a corresponding base skin color. In the example, the centroid value of each of nine base skin colors (Base Skin Colors A, B, C, D, E, F, G, H, and I) is shown. In the example, each centroid is represented by an RGB value.

Figure 10:
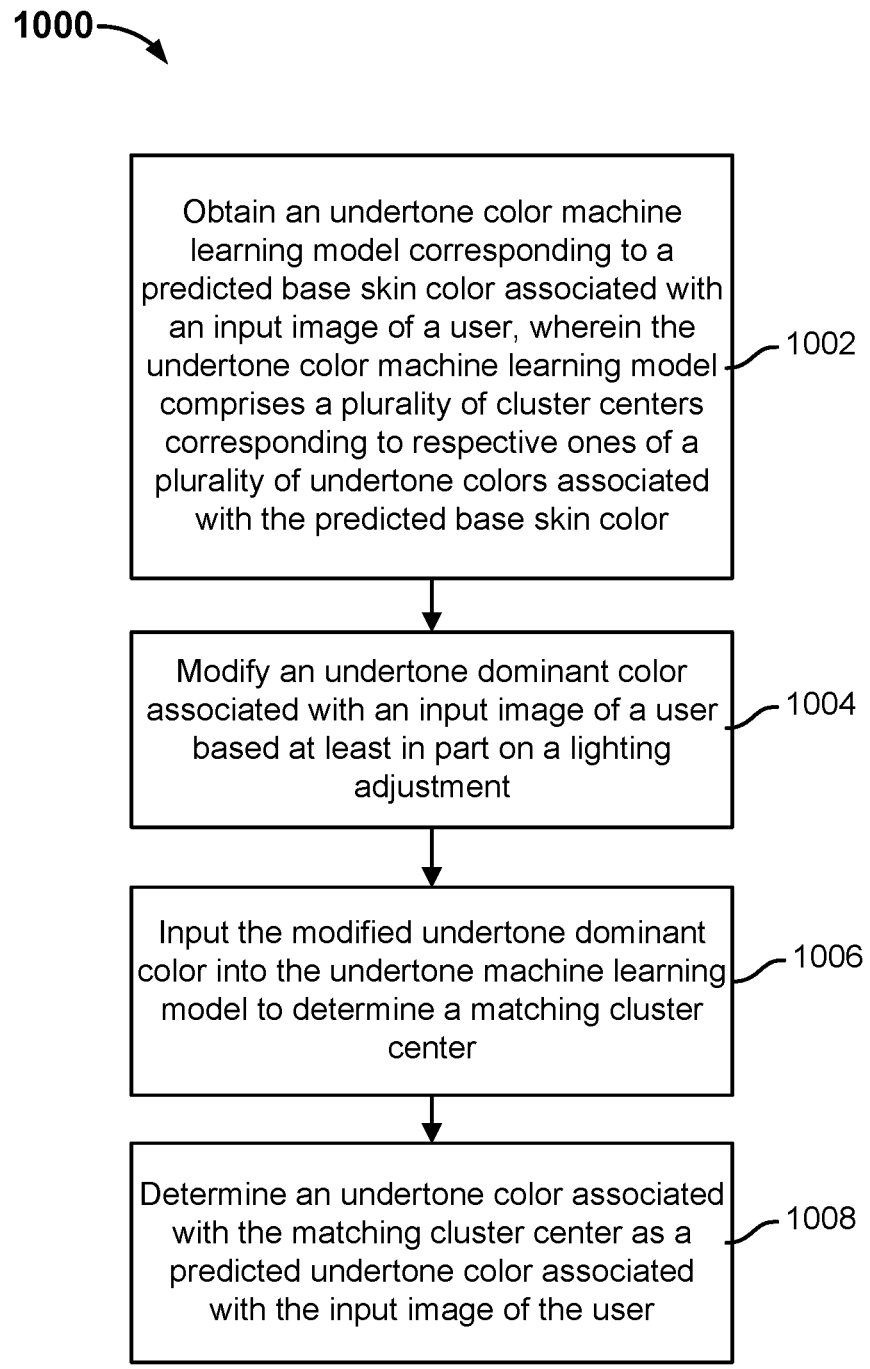
FIG. 10 is a flow diagram showing an embodiment of a process for a predicted undertone color for an input image of the user.

FIG. 10 is a flow diagram showing an embodiment of a process for a predicted undertone color for an input image of the user. In some embodiments, process 1000 of FIG. 10 may be performed by skin profile determination server 106 of FIG. 1. In some embodiments, at least a portion of process 300 of FIG. 3 may be implemented by process 1000.

At 1002, an undertone color machine learning model corresponding to a predicted base skin color associated with an input image of a user is obtained, wherein the undertone color machine learning model comprises a plurality of cluster centers corresponding to respective ones of a plurality of undertone colors associated with the predicted base skin color. An undertone color machine learning model that corresponds to the predicted base skin color of an input image of a user (e.g., that is determined using process 700 of FIG. 7) is trained with images of veins that are pre-labeled with the corresponding undertone colors of the users (e.g., on the faces of the users) who are included in those images. Put another way, there is a corresponding undertone machine learning model for each base skin color cluster that is associated with the base skin color machine learning model (e.g., of FIG. 8). In some embodiments, each undertone machine learning model is determined by clustering the pixel values of images that are associated with the model's associated base skin color and also pre-labeled with the respective undertones that correspond with that base skin color. In some embodiments, the pixel values of pre-labeled images of veins are clustered by their respective RGB (and/or HSV, HSL, CIELAB, CYMK) values. Each resulting cluster would be associated with a corresponding undertone color label. For example, the undertone color that is associated with each cluster is the most frequently occurring pre-labeled undertone color associated with images in that cluster.

At 1004, an undertone dominant color associated with an input image of a user is modified based at least in part on a lighting adjustment.

At 1006, the modified undertone dominant color is input into the undertone machine learning model to determine a matching cluster center. The center/representative (e.g., centroid) value of each cluster is determined. The "undertone dominant color" for the input image of the user (e.g., that was determined using the process of FIG. 5) is modified by the "lighting adjustment" (e.g., that was determined using process 600 of FIG. 6).

At 1008, an undertone color associated with the matching cluster center is determined as a predicted undertone color associated with the input image of the user. The modified undertone dominant color is input into the undertone color machine learning model. The center (e.g., centroid) (e.g., RGB) value that is the closest to the modified undertone dominant color value is determined as the "predicted undertone color."

FIG. 11 is a diagram showing an example table storing the centroid values across undertone clusters associated with four example undertone color machine learning models. In the example of FIG. 11, there are five possible undertones (Undertones 1, 2, 3, 4, and 5) that are associated with each undertone color machine learning model. In the example, there are four base skin color clusters (Base Skin Colors A, B, C, and D) each associated with a base skin color machine learning model and therefore, there are four corresponding undertone color machine learning models. As such, in the table, each undertone color (Undertones 1, 2, 3, 4, and 5) is stored with a corresponding centroid value that is represented by an RGB value from a corresponding cluster of images in each of the four undertone color machine learning models.

Figure 12:
FIG. 12 is a diagram showing an example user interface that presents a skin profile associated with a user.

FIG. 12 is a diagram showing an example user interface that presents a skin profile associated with a user. In this example, the skin profile includes the predicted base skin color and the predicted undertone color that were determined based on an input image of a user using techniques described herein. As shown in the example, the predicted base skin color for the user is "medium-dark" skin and the predicted undertone color is "warm." In some embodiments, predefined mappings between skin colors and/or undertone colors and compatible color palettes are used to determine compatible colors corresponding to the predicted base skin color and the predicted undertone color that were determined for the user. The example user interface of FIG. 12 shows example color palettes that are compatible to the user's medium-dark and warm skin.

Figure 13:
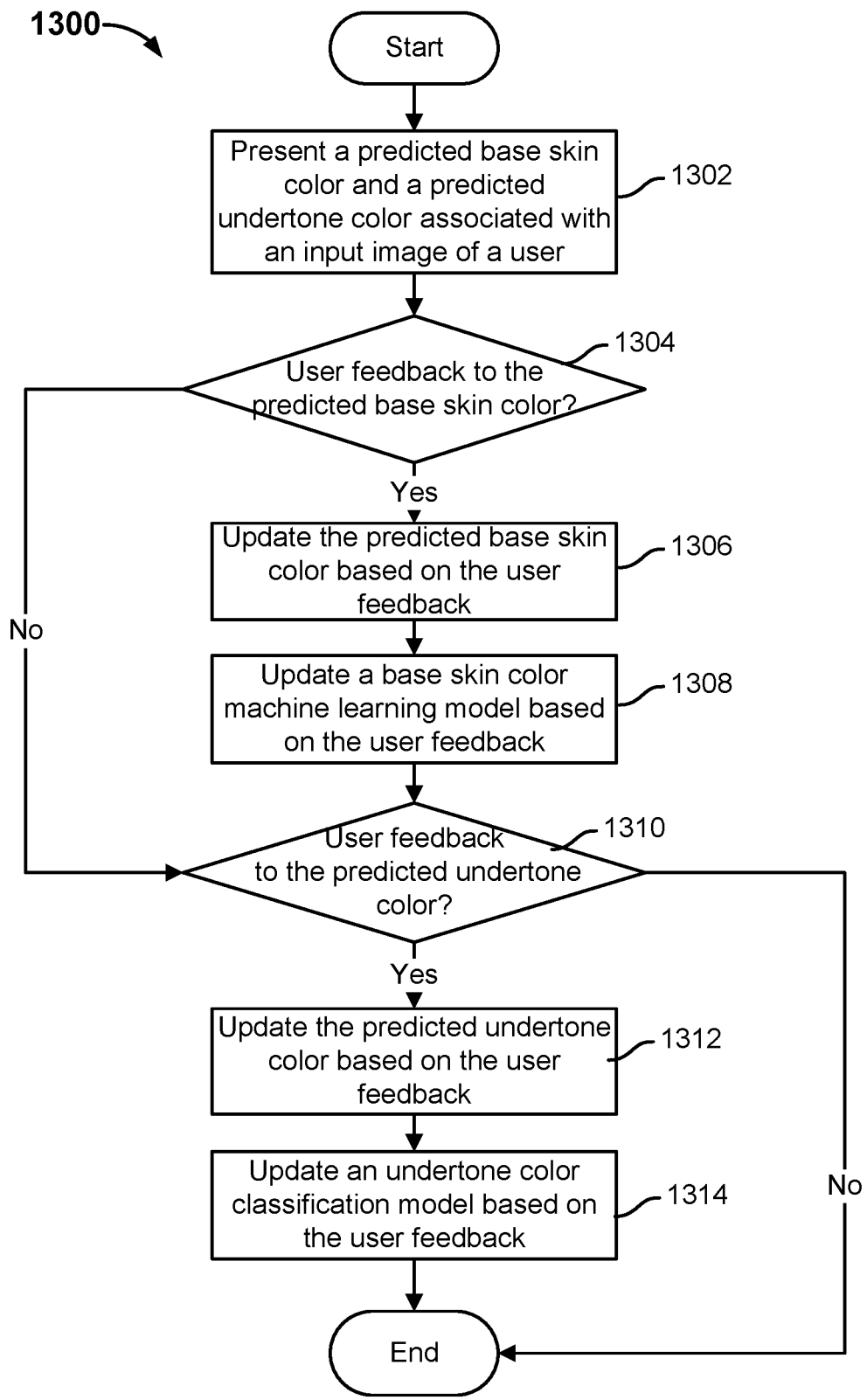
FIG. 13 is a flow diagram showing an example process of receiving user feedback to the determined skin profile.

FIG. 13 is a flow diagram showing an example process of receiving user feedback to the determined skin profile. In some embodiments, process 1300 of FIG. 13 may be performed by skin profile determination server 106 of FIG. 1. In some embodiments, at least a portion of process 300 of FIG. 3 may be implemented by process 1300.

At 1302, a predicted base skin color and a predicted undertone color associated with an input image of a user are presented. Representations of the determined user skin profile including the predicted base skin color and the predicted undertone color (that are determined using techniques described herein) are presented for the user (e.g., in a user interface such as the user interface of FIG. 12).

At 1304, it is determined whether user feedback to the predicted base skin color is received. In the event that user feedback to the predicted base skin color is received, control is transferred to 1306. Otherwise, in the event that user feedback to the predicted base skin color is not received, control is transferred to 1310.

At 1306, the predicted base skin color is updated based on the user feedback.

At 1308, a base skin color machine learning model is updated based on the user feedback.

In response to the presentation of the predicted base skin color and predicted undertone color, a user may provide user feedback (e.g., via a field, button, or control that is presented at the user interface) to either of the predicted base skin color and the predicted undertone color. For example, the user can provide feedback that indicates that the user's actual base skin color is darker or lighter than the predicted base skin color. A user feedback to the predicted base skin color may be used to update (e.g., retrain) the base skin color machine learning model that was used to determine the predicted base skin color. As more user feedback on the predicted base skin color is received over time, more data can be used to retrain the skin color machine learning model, which could lead to the identification of more skin color clusters and therefore, more granular determinations of base skin color.

At 1310, it is determined whether user feedback to the predicted undertone color is received. In the event that user feedback to the predicted undertone color is received, control is transferred to 1312. Otherwise, in the event that user feedback to the predicted undertone color is not received, process 1300 ends.

At 1312, the predicted undertone color is updated based on the user feedback.

At 1314, an undertone color machine learning model is updated based on the user feedback.

For example, the user can provide feedback that indicates that the user's actual undertone color is in a different part of the color spectrum than the predicted undertone color. A users feedback to the predicted undertone color may be used to update (e.g., retrain) the undertone color machine learning model that was used to determine the predicted undertone color. As more user feedback on predicted undertone color is received over time, more data can be used to retrain each undertone color machine learning model, which could lead to the identification of more undertone color clusters and therefore, more granular determinations of undertone color. As such, user feedback to predicted base skin and/or undertone colors could be used to dynamically improve the models that are used to generate subsequent predicted base skin and/or undertone colors for users.

Figure 14:
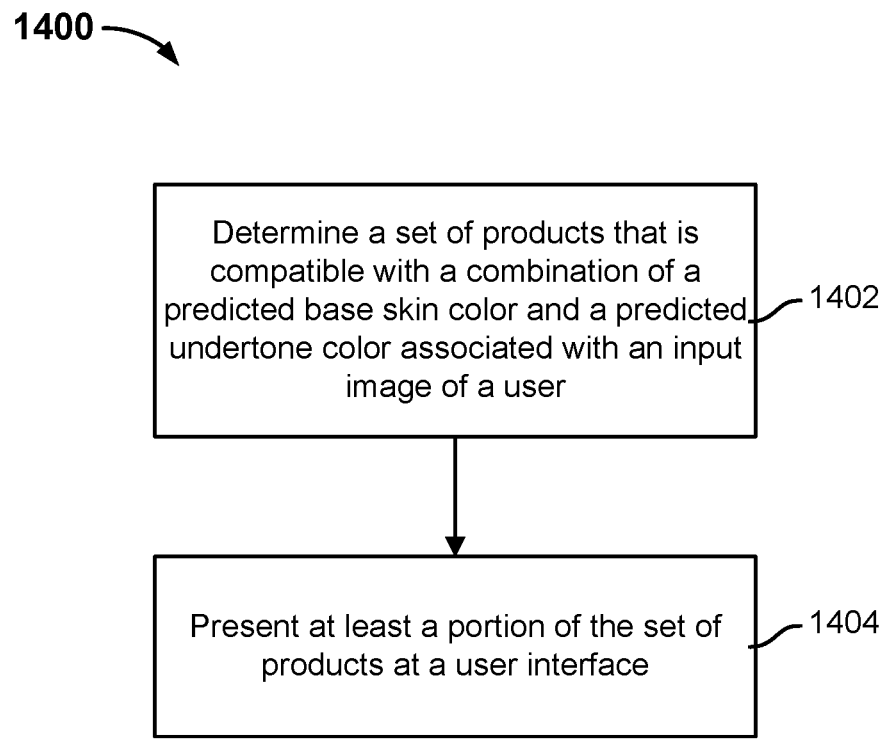
FIG. 14 is a flow diagram showing an example of a process recommending a set of products based on a user skin profile.

FIG. 14 is a flow diagram showing an example of a process recommending a set of products based on a user skin profile. In some embodiments, process 1400 of FIG. 14 may be performed by skin profile determination server 106 of FIG. 1. In some embodiments, at least a portion of process 300 of FIG. 3 may be implemented by process 1400.

At 1402, a set of products that is compatible with a combination of a predicted base skin color and a predicted undertone color associated with an input image of a user is determined. In this example, the skin profile includes the predicted base skin color and the predicted undertone color that were determined based on an input image of a user using techniques described herein.

At 1404, at least a portion of the set of products is presented at a user interface. In various embodiments, products (e.g., cosmetics, clothing, jewelry, accessories, etc.) that are compatible with the combination of the predicted base skin color and the predicted undertone color (e.g., based on predefined mappings between skin profiles and products and/or another type of recommendation engine) and/or versions of the predicted base skin color and the predicted undertone color that are modified by user feedback are determined and then recommended to the user at a user interface. In some embodiments, the products are clean cosmetics that do not include any known toxic ingredients. In some embodiments, other user attributes (e.g., sebum levels, pigmentation levels, etc.) can be used in addition to the predicted base skin color and the predicted undertone to determine products to recommend to the user. In some embodiments, recommended products that the user engages with (e.g., browse or purchase) can be used to update future recommendations of products for users. In some embodiments, at least some of the products that are compatible with the combination of the predicted base skin color and the predicted undertone color may be filtered out based on one or more filtering conditions that are input by the user (e.g., ingredients to which the user is allergic or sensitive).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor configured to:
   access an input image of a user, wherein the input image is of a body part that includes a vein;
   derive a first sub-component based at least in part on the input image of the user, wherein the first sub-component is associated with the body part without the vein;
   derive a second sub-component based at least in part on the input image of the user, wherein the second sub-component is associated with the vein;
   derive a third sub-component based at least in part on the input image of the user, wherein the third sub-component is associated with background content without the body part or the vein;
   determine a skin dominant color associated with the input image of the user based at least in part on clustering pixel values from the first sub-component;
   determine an undertone dominant color associated with the input image of the user based at least in part on clustering pixel values from the second sub-component;
   determine a background dominant color associated with the input image of the user based at least in part on clustering pixel values from the third sub-component;
   use a first machine learning model and the first sub-component to determine a predicted base skin color associated with the user;
   select a second machine learning model based at least in part on the predicted base skin color associated with the user;
   use the second machine learning model and the second sub-component to determine a predicted undertone color associated with the user;
   obtain user feedback corresponding to the predicted base skin color;
   perform machine learning model updating using the user feedback;
   determine one or more product recommendations based at least in part on the predicted base skin color associated with the user and the predicted undertone color associated with the user; and
   present at least a subset of the one or more product recommendations at a user interface; and
   a memory coupled to the processor and configured to provide the processor with instructions.

2. The system of claim 1, wherein the processor is further configured to:

obtain a lighting adjustment model;
obtain the background dominant color associated with the input image of the user; and
use the lighting adjustment model to determine a lighting adjustment associated with the input image of the user based at least in part on the background dominant color associated with the input image.

3. The system of claim 1, wherein the first machine learning model comprises a plurality of cluster centers corresponding to respective ones of a plurality of skin colors, and wherein to use the first machine learning model and the first sub-component to determine the predicted base skin color associated with the user comprises to:
input the skin dominant color into the first machine learning model to determine a matching cluster center; and
determine a skin color associated with the matching cluster center as the predicted base skin color.

4. The system of claim 1, wherein the second machine learning model comprises a plurality of cluster centers corresponding to respective ones of a plurality of undertone colors corresponding to the predicted base skin color associated with the user, and wherein to use the second machine learning model and the second sub-component to determine the predicted undertone color associated with the user comprises to:
input the undertone dominant color into the second machine learning model to determine a matching cluster center; and
determine an undertone color associated with the matching cluster center as the predicted undertone color.

5. The system of claim 1, wherein to perform the machine learning model updating using the user feedback comprises to update the first machine learning model based at least in part on the user feedback corresponding to the predicted base skin color.

6. The system of claim 1, wherein the processor is further configured to obtain user feedback corresponding to the predicted undertone color.

7. The system of claim 6, wherein the processor is further configured to update the second machine learning model based at least in part on the user feedback corresponding to the predicted undertone color.

8. A method, comprising:
accessing an input image of a user, wherein the input image is of a body part that includes a vein;
deriving a first sub-component based at least in part on the input image of the user, wherein the first sub-component is associated with the body part without the vein;
deriving a second sub-component based at least in part on the input image of the user, wherein the second sub-component is associated with the vein;
deriving a third sub-component based at least in part on the input image of the user, wherein the third sub-component is associated with background content without the body part or the vein;
determining a skin dominant color associated with the input image of the user based at least in part on clustering pixel values from the first sub-component;
determining an undertone dominant color associated with the input image of the user based at least in part on clustering pixel values from the second sub-component;
determining a background dominant color associated with the input image of the user based at least in part on clustering pixel values from the third sub-component;
using a first machine learning model and the first sub-component to determine a predicted base skin color associated with the user;
selecting a second machine learning model based at least in part on the predicted base skin color associated with the user;
using the second machine learning model and the second sub-component to determine a predicted undertone color associated with the user;
obtaining user feedback corresponding to the predicted base skin color;
performing machine learning model updating using the user feedback;
determining one or more product recommendations based at least in part on the predicted base skin color associated with the user and the predicted undertone color associated with the user; and
presenting at least a subset of the one or more product recommendations at a user interface.

9. The method of claim 8, further comprising:
obtaining a lighting adjustment model;
obtaining the background dominant color associated with the input image of the user; and
using the lighting adjustment model to determine a lighting adjustment associated with the input image of the user based at least in part on the background dominant color associated with the input image.

10. The method of claim 8, wherein the first machine learning model comprises a plurality of cluster centers corresponding to respective ones of a plurality of skin colors, and wherein using the first machine learning model and the first sub-component to determine the predicted base skin color associated with the user comprises:
inputting the skin dominant color into the first machine learning model to determine a matching cluster center; and
determining a skin color associated with the matching cluster center as the predicted base skin color.

11. The method of claim 8, wherein the second machine learning model comprises a plurality of cluster centers corresponding to respective ones of a plurality of undertone colors corresponding to the predicted base skin color associated with the user, and wherein using the second machine learning model and the second sub-component to determine the predicted undertone color associated with the user comprises:
inputting the undertone dominant color into the second machine learning model to determine a matching cluster center; and
determining an undertone color associated with the matching cluster center as the predicted undertone color.

12. The method of claim 8, wherein performing the machine learning model updating using the user feedback comprises updating the first machine learning model based at least in part on the user feedback corresponding to the predicted base skin color.

13. The method of claim 8, further comprising obtaining user feedback corresponding to the predicted undertone color.

14. A computer program product, the computer program product being embodied in a non-transitory computer-readable storage medium and comprising computer instructions for:
accessing an input image of a user, wherein the input image is of a body part that includes a vein;

deriving a first sub-component based at least in part on the input image of the user, wherein the first sub-component is associated with the body part without the vein;

deriving a second sub-component based at least in part on the input image of the user, wherein the second sub-component is associated with the vein;

deriving a third sub-component based at least in part on the input image of the user, wherein the third sub-component is associated with background content without the body part or the vein;

determining a skin dominant color associated with the input image of the user based at least in part on clustering pixel values from the first sub-component;

determining an undertone dominant color associated with the input image of the user based at least in part on clustering pixel values from the second sub-component;

determining a background dominant color associated with the input image of the user based at least in part on clustering pixel values from the third sub-component;

using a first machine learning model and the first sub-component to determine a predicted base skin color associated with the user;

selecting a second machine learning model based at least in part on the predicted base skin color associated with the user;

using the second machine learning model and the second sub-component to determine a predicted undertone color associated with the user;

obtaining user feedback corresponding to the predicted base skin color;

performing machine learning model updating using the user feedback;

determining one or more product recommendations based at least in part on the predicted base skin color associated with the user and the predicted undertone color associated with the user; and presenting at least a subset of the one or more product recommendations at a user interface.

15. The computer program product of claim 14, further comprising computer instructions for:

obtaining a lighting adjustment model;

obtaining the background dominant color associated with the input image of the user; and using the lighting adjustment model to determine a lighting adjustment associated with the input image of the user based at least in part on the background dominant color associated with the input image.

16. The computer program product of claim 14, wherein the first machine learning model comprises a plurality of cluster centers corresponding to respective ones of a plurality of skin colors, and wherein using the first machine learning model and the first sub-component to determine the predicted base skin color associated with the user comprises:

inputting the skin dominant color into the first machine learning model to determine a matching cluster center; and determining a skin color associated with the matching cluster center as the predicted base skin color.

17. The computer program product of claim 14, wherein the second machine learning model comprises a plurality of cluster centers corresponding to respective ones of a plurality of undertone colors corresponding to the predicted base skin color associated with the user, and wherein using the second machine learning model and the second sub-component to determine the predicted undertone color associated with the user comprises:

inputting the undertone dominant color into the second machine learning model to determine a matching cluster center; and determining an undertone color associated with the matching cluster center as the predicted undertone color.

18. The computer program product of claim 14, wherein performing the machine learning model updating using the user feedback comprises updating the first machine learning model based at least in part on the user feedback corresponding to the predicted base skin color.

19. The computer program product of claim 14, further comprising computer instructions for obtaining user feedback corresponding to the predicted undertone color.

* * * * *